US006721807B2

(12) United States Patent
Vlissides

(10) Patent No.: US 6,721,807 B2
(45) Date of Patent: Apr. 13, 2004

(54) EXTENSIBLE AND EFFICIENT DOUBLE DISPATCH IN SINGLE-DISPATCH OBJECT-ORIENTED PROGRAMMING LANGUAGES

(75) Inventor: John Matthew Vlissides, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 09/767,253

(22) Filed: Jan. 22, 2001

(65) Prior Publication Data

US 2002/0099866 A1 Jul. 25, 2002

Related U.S. Application Data

(60) Provisional application No. 60/224,125, filed on Aug. 10, 2000.

(51) Int. Cl.[7] .................................................. G06F 9/44
(52) U.S. Cl. ........................ 709/315; 709/316; 717/116
(58) Field of Search ................................. 709/315, 316, 709/328; 717/100, 107, 108, 116, 109, 128, 165

(56) References Cited

U.S. PATENT DOCUMENTS

| 5,307,490 | A | * | 4/1994 | Davidson et al. ............ 709/328 |
| 6,032,252 | A | * | 2/2000 | Petro et al. .................. 712/233 |
| 6,106,573 | A | * | 8/2000 | Mahalingaiah et al. ..... 717/128 |
| 6,138,269 | A | * | 10/2000 | Ball et al. ................... 717/108 |
| 6,185,728 | B1 | * | 2/2001 | Hejlsberg ................... 717/109 |
| 6,195,791 | B1 | * | 2/2001 | Carlson et al. ............. 717/100 |
| 6,266,708 | B1 | * | 7/2001 | Austvold et al. ........... 709/315 |
| 6,415,434 | B1 | * | 7/2002 | Kind ........................... 717/107 |

OTHER PUBLICATIONS

Gamma, et al, Visitor, Object Behavioral, Design Patterns 331–344 (1995).
Vlissides, "Visiting Rights," Pattern Hatching, 29–38 (1998).
Vlissides, "Visitor Revisited," Pattern Hatching, 79–85 (1998).
Martin, "Acyclic Visitor," Variations on Design Patterns, 93–103.

* cited by examiner

*Primary Examiner*—John Follansbee
*Assistant Examiner*—Van Nguyen
(74) *Attorney, Agent, or Firm*—Ryan, Mason & Lewis, LLP; Casey P. August, Esq.

(57) ABSTRACT

An improved method and system is described for implementing double dispatch extensibly and efficiently in single-dispatch object-oriented programming languages. Objects of type Visitor encapsulate double dispatch functionality, while objects of type Element act as operands. Double dispatch takes place by calling Accept on an object of type Element, passing an object of type Visitor as an argument. Concrete classes of type Element are added in groups, each group deriving from an abstract subclass of Element. An AbstractElement class augments the Element interface with an Accept operation that takes an object of type AppVisitor as an argument, where AppVisitor is an abstract subclass of Visitor. AppVisitor overrides the base class Visit operation to test the type of its Element argument, casting it into an AppElement and calling its augmented Accept. By committing to a client-specific AppVisitor interface as deeply in the Visitor class hierarchy as possible, the set of concrete element subclasses may be extended without changing the Visitor base class. Clients that rely on double dispatch are thus unaffected by such extension. Moreover, by calling the AbstractElement-augmented Accept rather than performing more extensive type tests for concrete Element subclasses, running time is improved over approaches that rely on more extensive type testing. Default functionality is easily accommodated as well.

16 Claims, 12 Drawing Sheets

EXTENSIBLE AND EFFICIENT DOUBLE DISPATCH IN SINGLE-DISPATCH OBJECT-ORIENTED PROGRAMMING LANGUAGES

CROSS REFERENCE TO RELATED APPLICATIONS

This application claims the benefit of U.S. Provisional Application No. 60/224,125, filed Aug. 10, 2000.

FIELD OF THE INVENTION

This invention relates to the field of object-oriented programming and, more specifically, to extensible and efficient double dispatch in single-dispatch object-oriented programming languages.

BACKGROUND OF THE INVENTION

Three concepts are central to object-oriented programming: encapsulation, inheritance, and polymorphism. Encapsulation refers to how implementation details are hidden by an abstraction called an "object." An object is said to encapsulate code and data as defined by a "class," of which the object is an "instance." An object is created by "instantiating" its class. The class specifies the code and data associated with each instance. A "concrete class" includes all the code necessary for instances to work correctly and may thus be instantiated. An "abstract class" may have some of the code or no code at all. Hence, it cannot be instantiated.

An object-oriented software system is made up of objects interacting with one another by "sending messages," also known as "calling operations." The set of messages (operations) that an object understands is called its "interface." An object implements its response to a message in a "method" that is common to all instances of the object's class. A method typically elicits collateral message sends. Objects are unaware of each other's implementations. Objects only know the messages to which other objects can respond. Encapsulation controls complexity by partitioning the software system into small, well-defined pieces, and it makes it easy to change part of the system without affecting other parts.

Inheritance defines classes in terms of other classes. Class B that inherits from class A is called a "subclass" or "derived class" of class A (which is called the "parent class," "base class," or "superclass"). Class C derived from B may be termed a "descendant" of A as opposed to a "subclass." The subclass responds to the same messages as its parent, and it may respond to additional messages as well. The subclass "inherits" its implementation from its parent, although it may choose to re-implement some methods, add more data, or both. An abstract class may explicitly defer implementation of a method to subclasses. Such a method (or operation) is termed "abstract" as it has no implementation. Non-abstract operations are sometimes called "concrete operations." Inheritance lets programmers define new classes easily as incremental refinements of existing ones. It also enables polymorphism.

Polymorphism refers to the substitutability of related objects. Objects are "related" if they have the same "type," and in most object-oriented languages that means they are instances of the same class, or they have a common superclass through inheritance. Objects of the same type are said to have "compatible interfaces."

Objects with compatible interfaces may be treated uniformly, that is, without regard to their specific type. For example, a Graphic class that defines an abstraction for graphical objects may define a Draw method. The Graphic class might have subclasses Rectangle and Circle that re-implement Draw to draw a rectangle and circle, respectively. Polymorphism allows Rectangle and Circle instances to be treated uniformly as Graphic objects. In other words, all one needs to know to tell an object to draw itself is that the object is an instance of a Graphic subclass. Whether the object is an instance of Rectangle or Circle is immaterial; one can send it the Draw message without knowing its exact type (e.g., Rectangle or Circle).

Declaring the type of an object explicitly in the program lets the compiler ensure that objects are sent only messages that they implement. Compile-time checks for type incompatibility are valuable because they can catch common programming errors. If a program contains code that attempts to send a message to an object that does not implement a corresponding method—a coding error—then the compiler can detect it before the program is ever run. A compiler that performs such checks is said to enforce "static type safety."

However, a programmer may circumvent the type checks run by the compiler through programming language mechanisms such as casts and run-time type tests. The former coerces an object to a particular (and possibly incompatible) type, while the latter tests the type of an object and performs computation based on the outcome of the test. Because these mechanisms are invoked at run-time, they are usually beyond the ability of the compiler to check. Thus they may induce type-related failures at run-time. Programs that can fail in this way are called "type-unsafe."

An important goal of software design generally, and object-oriented design in particular, is to permit change in functionality without change in existing code—additive change instead of invasive change. Polymorphism furthers this goal by letting programmers write general code that can be customized later without change. Suppose there is code that draws pictures by sending Draw messages to a set of Graphic instances. Rectangle and Circle objects may be passed to such code, and it will tell the objects to draw themselves. Later, a new subclass of Graphic can be defined, say Polygon, implementing its Draw method appropriately. Because Polygon is a subclass of Graphic, instances of Polygon may be passed to the picture-drawing code, and it will draw polygons in the picture—with no modification whatsoever.

This example of polymorphism illustrates "single dispatch": the code that executes in response to a message depends on the message (e.g., Draw) and the type of the receiver (Rectangle, Circle, etc.). It is also possible to dispatch on more than one type. Suppose one wants to draw a polygon either on the display or on hardcopy. The code for drawing a polygon on the display is likely to differ drastically from the code that prints it out. One could therefore define a class Device that abstracts the output device, with subclasses Display and Printer. If a programming language allows one to dispatch on two types—the Graphic subclass and the Device subclass—then the language supports "double dispatch," as the code that executes in response to a message send (e.g., Draw) depends on the message and the type of two receivers (e.g., Circle and Printer). Single and double dispatch exemplify the more general notion of "multiple dispatch," which permits dispatch on any number of types.

Mainstream object-oriented programming languages such as C++, Eiffel, Java, and Smalltalk support only single dispatch directly. Double and higher-order dispatch must be implemented explicitly in such languages. The VISITOR pattern [described in Gamma, E., et al., Design Patterns: Elements of Reusable Object-Oriented Software, Addison-Wesley, Reading, Mass., 1995] is a well-known approach to implementing double dispatch in single-dispatch languages.

VISITOR encapsulates double-dispatch functionality in concrete Visitor subclasses of a Visitor class. Double dispatch occurs when an instance of an Element subclass (e.g., ConcreteElement) receives an Accept message with an object of type Visitor as a parameter. In response, Accept sends a message to the Visitor; exactly which message depends on the particular Element subclass. In effect, this message identifies the concrete Element to the concrete Visitor and invokes code that is specific to the ConcreteVisitor-ConcreteElement pair—thereby effecting double dispatch.

FIG. 1 shows a Unified Modeling Language (UML) diagram of a typical VISITOR implementation. This figure (and FIG. 2) may be seen in Gamma, E., et al., Design Patterns: Elements of Reusable Object-Oriented Software, Addison-Wesley, Reading, Mass., 1995, p. 331–334, the disclosure of which is hereby incorporated by reference. FIG. 1 shows a Client object interacting with Visitor and Element (through ObjectStructure) classes. The Visitor class is a base class, and the ConcreteVisitor1 and ConcreteVisitor2 concrete classes are subclasses of Visitor. Similarly, Element is a base class, and ConcreteElementA and ConcreteElementB are concrete classes that are subclasses of Element. Visitor defines several methods (e.g., VisitConcreteElementA and VisitConcreteElementB) that the concrete classes inherit. Element also defines a method, Accept, that the subclasses of Element inherit. The subclasses of Element also define methods OperationA and OperationB.

FIG. 2 shows a sequence diagram that helps to explain how the class structure of FIG. 1 functions. The object, anObjectStructure, sends a message Accept(aVisitor) to the object aConcreteElementA. The object aConcreteElementA then can call VisitConcreteElementA, passing itself (i.e., aConcreteElementA) as a parameter. When the method VisitConcreteElementA runs, both the type of visitor (ConcreteVisitor1) and the type of element (ConcreteElementA) are known. Thus the operation that is performed, namely OperationA( ), is specific to these two objects. In the series of object interactions, anObjectStructure also sends a message Accept(aVisitor) to the object aConcreteElementB. The object aConcreteElementB then can call VisitConcreteElementB, passing itself as a parameter of type ConcreteElementB. When the method VisitConcreteElementB runs, both the type of visitor (ConcreteVisitor1) and the type of element (ConcreteElementB) are known. Thus the operation that is performed, namely OperationB( ), is specific to these two objects.

The VISITOR approach is statically type-safe, since the Visitor class declares Visit messages for each and every Element subclass. It works well under the assumption that the Element hierarchy is stable while the functionality that applies to it is not. New behavior can be added noninvasively by defining new concrete Visitor classes.

While VISITOR supports statically type-safe double dispatch in single-dispatch languages, it has at least two weaknesses. First, it produces a cyclic dependency between the Visitor and Element class hierarchies. Specifically, the Visitor base class refers to Element subclasses, and Element subclasses refer to the Visitor base class. As a result, changes to either hierarchy may require recompiling the other, the expense of which may be prohibitive in large software systems. Second, introducing a new Element subclass usually requires changing the Visitor base class. This aspect of VISITOR necessitates invasive change.

There are two workarounds to these problems in the prior art. ACYCLIC VISITOR [described in Martin, R. C., "Acyclic Visitor," in Pattern Languages of Program Design 3, Martin, et al., eds., Addison-Wesley, Reading, Mass., 1998, the disclosure of which is incorporated herein by reference] removes method names from the Visitor class, declaring them solely in its subclasses. An Element subclass determines the message to send to a concrete Visitor using a run-time type test in its Accept method. While ACYCLIC VISITOR breaks the cyclic dependency, it does so at the expense of static type safety in all Visitor subclasses.

A catchall operation [described in Vlissides, J., Pattern Hatching: Design Patterns Applied, Addison-Wesley, Reading, Mass., 1998, the disclosure of which is incorporated herein by reference] primarily addresses the second weakness. It adds a method to the Visitor class that takes an Element as an argument. A new concrete Element subclass of Element will invoke this method in its Accept method, thereby avoiding the need to change the Visitor class. A concrete Visitor subclass that implements specialized code for this concrete Element must do so in the catchall operation, again using run-time type tests to differentiate each new Element subclass from every other. This too compromises static type safety, although only that of new Element subclasses, which are those Element subclasses added after defining the Visitor interface.

The catchall thus offers a greater degree of type safety than ACYCLIC VISITOR under the assumption that the Element hierarchy is relatively stable while the functionality that applies to it is not. The catchall requires a run-time type test for each new Element subclass, whereas ACYCLIC VISITOR requires a run-time type test for every Visitor subclass.

Both workarounds introduce an addition problem of cost. The overhead associated with the run-time type tests is proportional either to the total number of Visitor subclasses (in the case of ACYCLIC VISITOR) or to the number of new Element subclasses (in the catchall case). This cost is intolerable in some applications.

As a result of these problems, the discussed approaches are not effective for systems that require extensible, efficient, and statically type-safe double dispatch. A need exists for an extensible double-dispatch mechanism for single-dispatch languages that offers improved performance and static type safety.

SUMMARY OF THE INVENTION

In accordance with the aforementioned needs, the present invention is directed to an improved method and implementation of double dispatch for a program written in a single-dispatch object-oriented programming language.

In a first aspect of the invention, the present invention extends the VISITOR pattern to increase extensibility and efficiency. In particular, it applies the VISITOR pattern twice. The first application provides clients with the Visitor and Element interfaces devoid of references to subclasses or descendant classes: Visitor defines a single Visit operation taking a parameter of type Element, and Element defines a single Accept operation taking a parameter of type Visitor. The second application of VISITOR introduces the concrete descendant classes requiring double dispatch. These are added in pairs of hierarchies, each pair consisting of a hierarchy of classes rooted in an abstract subclass of Visitor, and a hierarchy of classes rooted in an abstract subclass of Element. The abstract subclass of Element introduces an Accept operation taking a parameter of type corresponding to the accompanying abstract subclass of Visitor. Akin to the VISITOR pattern, the abstract subclass of Visitor adds a Visit operation for each accompanying concrete descendant of the abstract Element subclass.

These two applications of VISITOR are connected through a run-time type test in the Visit operation of the Visitor class as implemented by the abstract Visitor subclass. This implementation selects among the pairs of hierarchies of classes requiring double dispatch. Apart from this run-time type test, static type safety is preserved within the two applications of VISITOR. Because the number of pairs is smaller than the total number of different double-dispatch operations required (and likely far smaller), the amount of run-time type testing is substantially less than that of the prior art.

In a second aspect of the present invention, a Visit operation is added that takes an instance of an abstract Element descendant as a parameter to avert an infinite recursion in the event that a new Element descendent is introduced after the Element and Visitor interfaces are defined.

In a third aspect of the present invention, one or more Visit operations in one or more abstract classes implement nontrivial default behavior.

A more complete understanding of the present invention, as well as further features and advantages of the present invention, will be obtained by reference to the following detailed description and drawings.

DETAILED DESCRIPTION OF PREFERRED EMBODIMENTS

Figure 1:
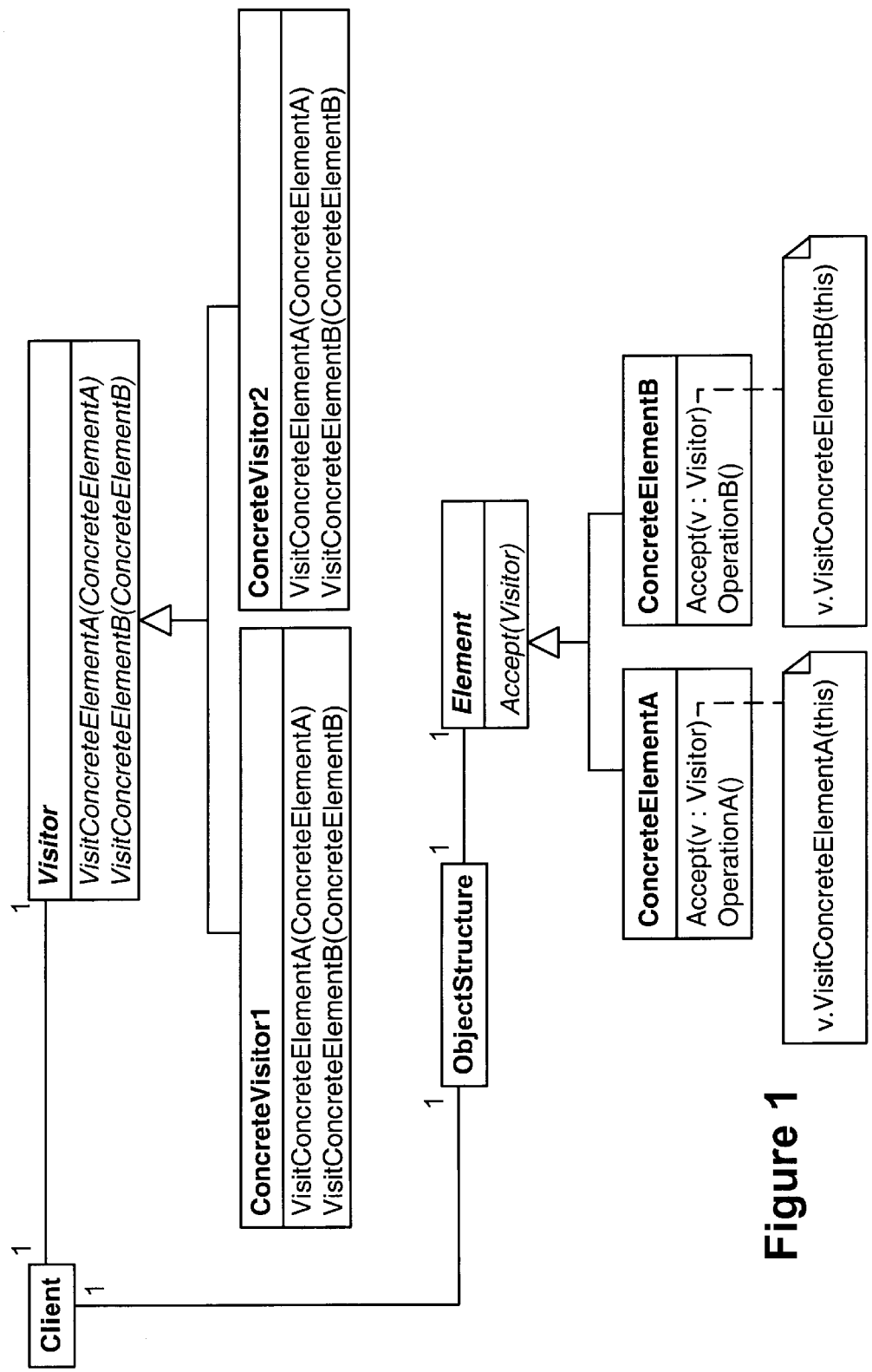
FIG. 1 shows a Unified Modeling Language (UML) class diagram depicting a prior art VISITOR pattern class structure.
Figure 2:
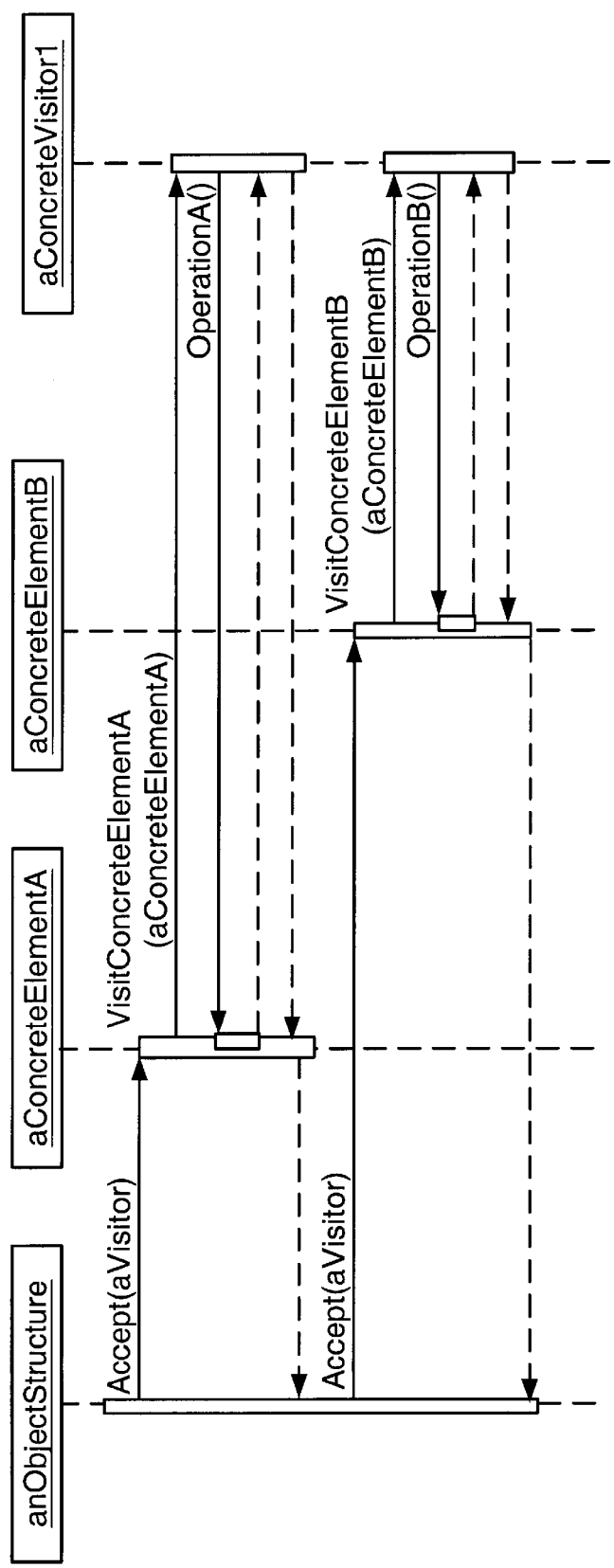
FIG. 2 shows a sequence diagram for the classes shown in FIG. 1.

In an aspect of the invention, two abstract classes, Visitor and Element, define Visit and Accept operations, respectively. The Accept operation takes a Visitor object as a parameter, and Visit takes an Element object as a parameter. Double dispatch takes place by sending Accept to an Element object, passing a Visitor object as an argument. Concrete descendants of Element are added in groups, each group deriving from a class, e.g., AppElement. This class in turn derives from Element. An AppElement class augments the Element interface with an Accept operation that takes an object of type AppVisitor as an argument. AppVisitor is an abstract subclass of Visitor. It augments the Visitor interface with a different Visit operation for each concrete Element class in the group, each operation taking an instance of the corresponding concrete Element class as an argument. Concrete subclasses of AppVisitor reimplement these operations to define distinct functionality for each type of concrete Element in the group.

Furthermore, the AppVisitor class reimplements the Visit operation of the Visit class. In this reimplemented Visit operation, if the argument is type-compatible with AppElement, then the operation coerces the type of the argument to AppElement and calls Accept on it again. This call will resolve statically not to the base class Accept but to the Accept that AppElement introduced. Each concrete Element reimplements this Accept operation to call the corresponding Visit operation on the argument—that is, the Visit operation that takes an object of that concrete Element type as an argument. Hence, the code that executes in response to the initial Accept depends on two specific types: the type of concrete Element, and the type of concrete Visitor. Thus double dispatch is effected.

The functionality for each type of concrete Element in a group may be extended by defining a concrete subclass of AppVisitor for each new functionality. The set of concrete Elements may also be extended by defining a new abstract subclass of Element, reimplementing its Accept and introducing a subclass-specific Accept as described earlier, and finally deriving concrete Element subclasses. Functionality specific to these new subclasses is introduced through concrete subclasses of a new abstract Visitor subclass. This extensibility does not require any change in clients as long as the Client depends exclusively on the base Element and Visitor interfaces. Such clients are also oblivious to all but one circular dependency—that between Element and Visitor. But since these interfaces need never change for the purposes of double dispatch, the circularity is moot.

The cost of this approach is constant: a type test plus an additional call to Accept. It is also statically type-safe across all types with the exception of abstract subclasses of Element, which are usually far fewer in number than all the concrete descendants of Element. The approach is thus more efficient and more type-safe than other methods.

Figure 3:
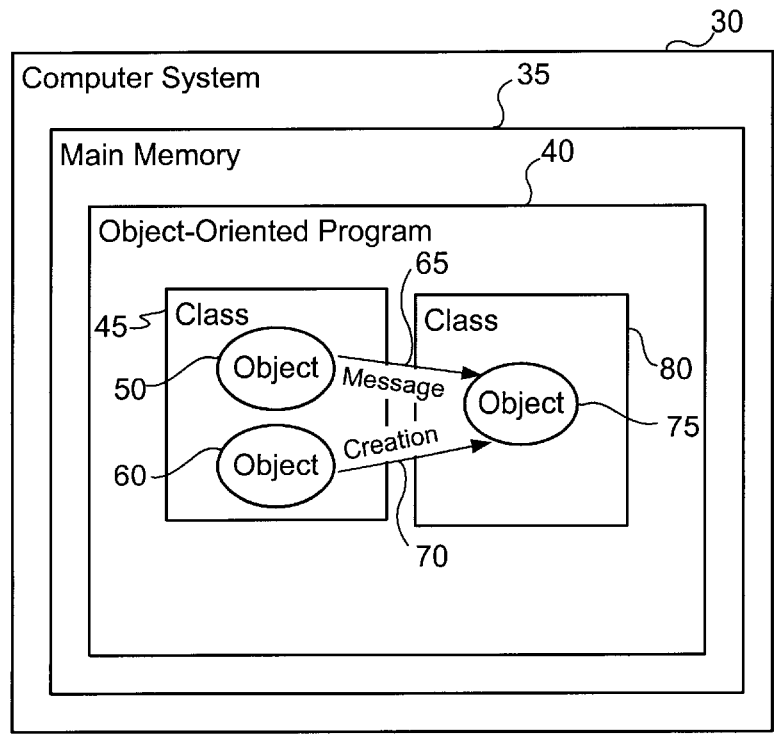
FIG. 3 is a diagram of a general-purpose computer system executing an object-oriented program, in accordance with a preferred embodiment of the present invention.

FIG. 3 shows a block diagram of a general-purpose Computer System 30 with Main Memory 35 in which the present invention may be implemented. An Object-Oriented Program 40 is loaded into Main Memory 35. Main Memory 35 is operable to store one or more instructions and data, which the computer system 30 is operable to retrieve, interpret, execute, and use. The Object-Oriented Program 40 is any object-oriented program known in the art. The Computer System 30 can be an IBM RS/6000 or any other general-purpose computer known in the art (RS/6000 is a trademark of the IBM Corporation).

One or more classes are defined by the Object-Oriented Program 40. Two such classes are depicted as Class 45 and Class 80. One or more objects are created when the Object-Oriented Program 40 is executed in the Computer System 30. These objects are instances of their respective class(es). FIG. 3 shows two such objects of Class 45 and one object of Class 80. The objects of Class 45 are Object 50 and Object 60. The object of Class 80 is Object 75. Objects communicate by sending messages, as shown by the arrow Message 65. Objects also create other objects, as shown by the arrow Creation 70.

Figure 4:
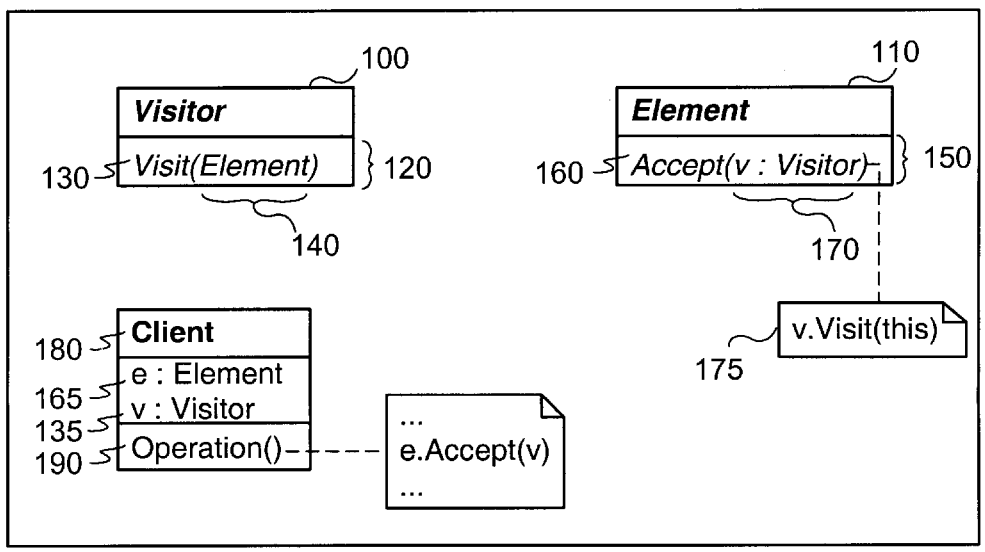
FIG. 4 shows UML class diagrams depicting the Visitor, Element, and Client classes, in accordance with a preferred embodiment of the present invention.

FIG. 4 shows three classes, Visitor 100, Element 110, and Client 180, defined in any object-oriented program known in the art. In a preferred embodiment, Visitor 100 and Element 110 are not instantiable classes; they each define an interface 120, 150 that concrete descendants must implement. However, Visitor 100 and Element 110 may provide default implementations of their interfaces. The names "Visitor," "Element," and all others in this description reflect a preferred embodiment. A given embodiment may use other names as substitutes.

Visitor's interface 120 contains a single operation, Visit 130, taking an argument 140 of type Element 110. Element's interface 150 contains a single operation, Accept 160, taking an argument 170 of type Visitor 100. In a preferred embodiment, Accept 160 contains a statement 175 that calls Visit 130 with an argument 170, passing the receiving instance ("this") as an argument 170. A Client 180 class contains an operation 190 that calls Accept 160 on an object of type Element 165, passing an object of type Visitor 135 as an argument. Alternatively, a Client operation 190 may call Visit 130 directly, passing the argument of type Element 140. Since Visitor 100 and Element 110 are abstract classes, the argument of type Element 140 and the argument of type Visitor 170 are necessarily instances of concrete descendants of Visitor 100 and Element 110.

Figure 5A:
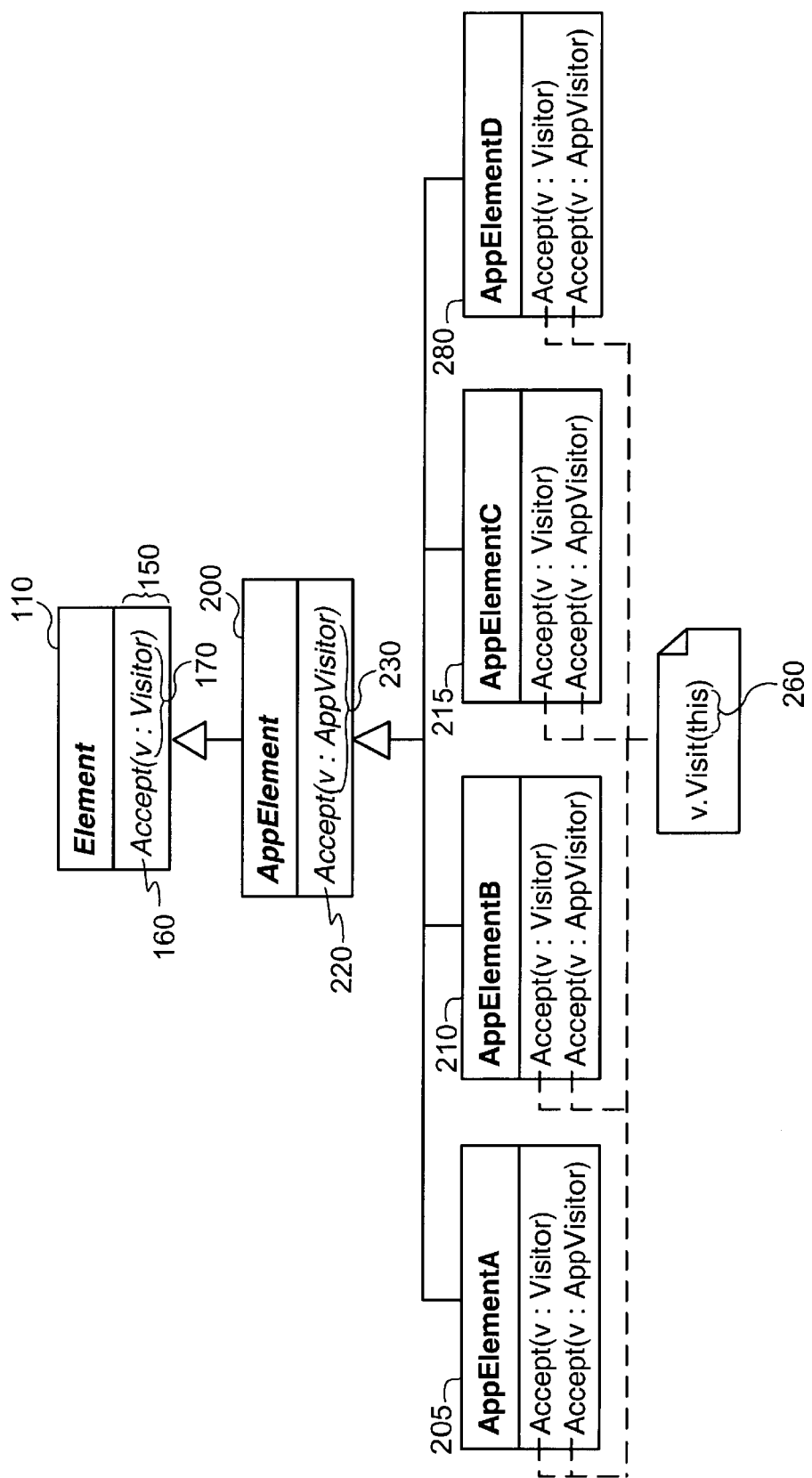
FIGS. 5A and 5B show UML class diagrams depicting Element and Visitor class hierarchies in accordance with a preferred embodiment of the present invention.
Figure 5B:
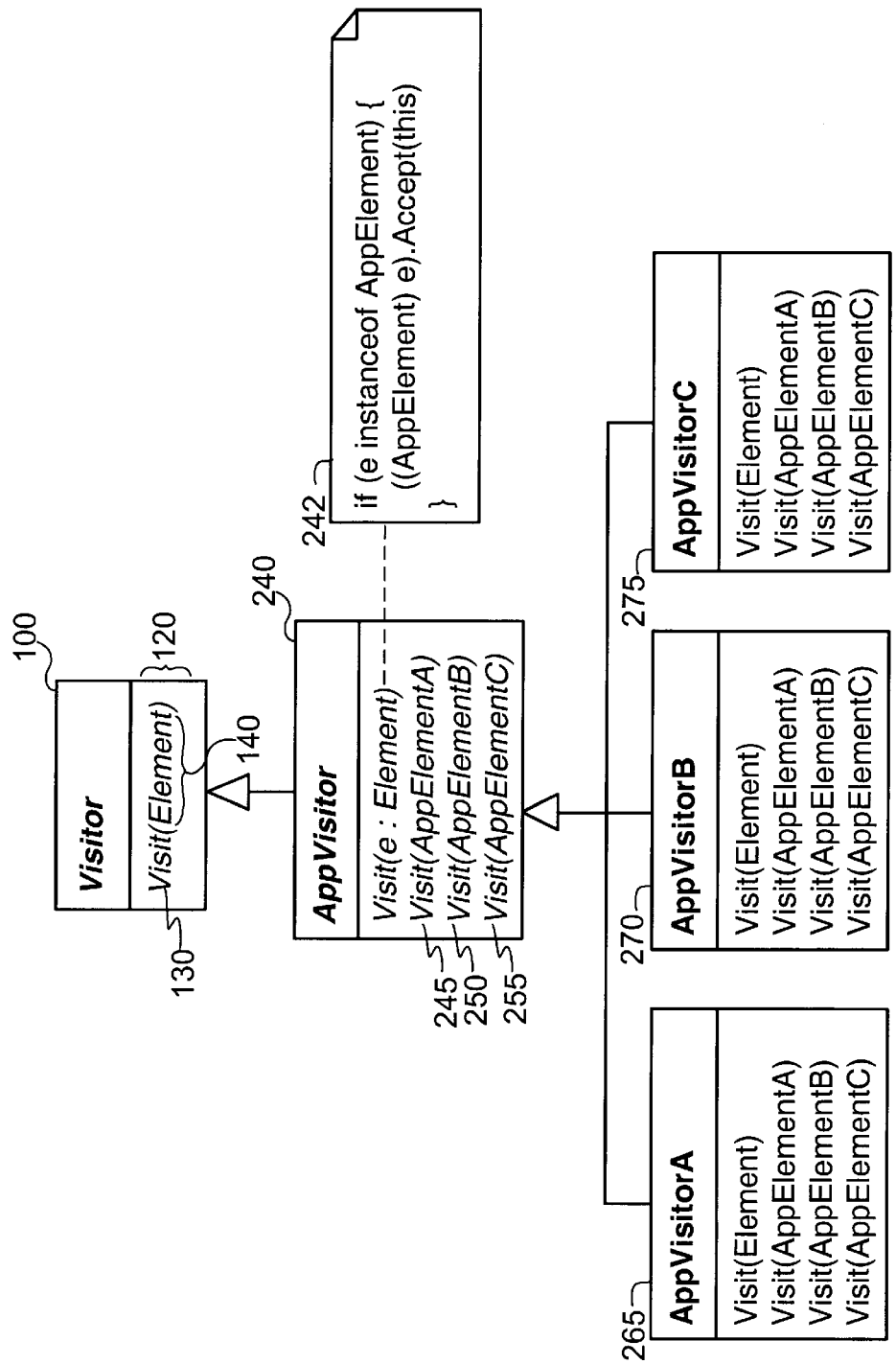

Concrete descendants of Visitor 100 and Element 110 are added in groups, each group rooted in an abstract subclass of Visitor 100 and Element 110, respectively. The groups may be added without changing the Visitor 100 class, the Element 110 class, or client classes that use them to effect double dispatch. FIGS. 5A and 5B illustrate such groupings. In a preferred embodiment, AppElement 200 is an abstract subclass of Element 110. AppElementA 205, AppElementB 210, and AppElementC 215 are concrete subclasses of AppElement 200. These concrete subclasses are descendants of the Element base class 110. There may be any number of such subclasses. In addition to the Accept 160 operation that AppElement 200 inherits from Element 110, AppElement 200 introduces an Accept 220 operation that takes an argument 230 of type AppVisitor 240, which is an abstract subclass of Visitor 100.

AppVisitor 240 implements the Visit 130 operation it inherits from Visitor 100 by attempting to downcast its argument 140 to the AppElement 200 type. This occurs in implementation 242. In a preferred embodiment, this downcast succeeds if the argument is type-compatible with AppElement. If so, the implementation by AppVisitor of Visit 130 calls the AppElement-specific Accept 220 on the newly downcast instance, passing the receiving instance itself of type AppVisitor 240 as an argument 242.

In addition to the Visit 130 operation that AppVisitor 240 inherits from Visitor 100, AppVisitor 240 introduces specialized Visit operations 245–255. Preferably, there is one specialized Visit operation for each concrete subclass 205–215 of AppElement 200. Each Visit operation 245–255 takes an instance of a different concrete AppElement subclass 205–215 as an argument. This allows each concrete subclass 205–215 of AppElement 200 to implement its version of Accept 220 by invoking a Visit operation 245–255 on the argument 230, passing the invoking instance itself 260 as a parameter. In a preferred embodiment, an Accept 220 of an AppElement subclass calls the Visit operation 245–255 whose argument exactly matches the type of the AppElement subclass 205–215. It is also possible for Accept 220 to call a Visit operation 245–255 that takes a non-matching argument.

AppVisitorA 265, AppVisitorB 270, and AppVisitorC 275 are concrete subclasses of AppVisitor 240. These classes are descendants of the Visitor base class 100. There may be any number of such concrete subclasses. Each concrete subclass 265–275 may provide a unique implementation of each of the Visit operations 245–255 of its superclass 240 tailored to the type of its argument 260. The result is double dispatch on the type of concrete AppVisitor subclass 265–275 and the type of concrete AppElement subclass 205–215.

As is known in the art, embodiments of the structure of FIGS. 5A and 5B and methods implementing it may be distributed as an article of manufacture that itself comprises a computer-readable medium having computer-readable code means embodied thereon. The computer-readable program code means is operable, in conjunction with a computer system, to carry out all or some of any steps required to perform embodiments of the present invention. The computer-readable medium may be a recordable medium (e.g., floppy disks, hard drives, Compact Disks, or memory sticks) or may be a transmission medium (e.g., a network comprising fiber-optics, the world-wide web, cables, or a wireless channel using time-division multiple access, code-division multiple access, or other radio-frequency channel). Any medium known or developed that can store information may be used.

Figure 6:
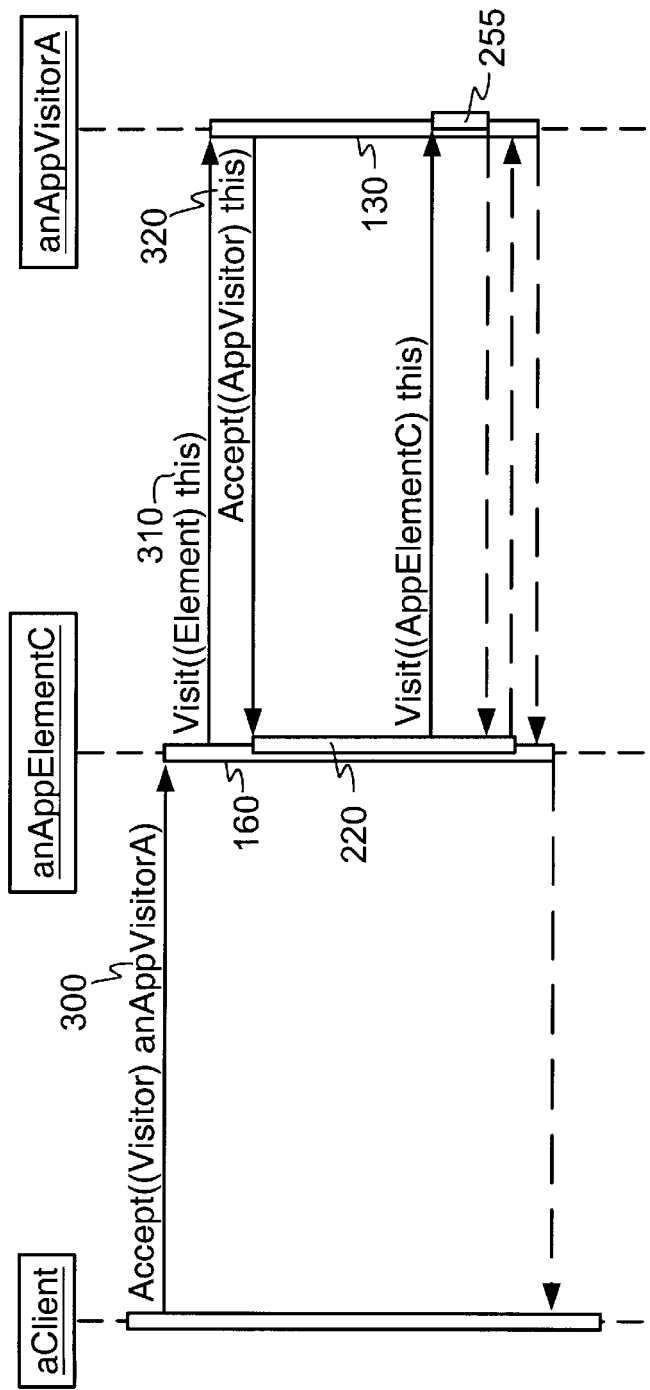
FIGS. 6 and 7 show two different sequence diagrams for the classes of FIGS. 5A and 5B, in accordance with preferred embodiments of the present invention.

Turning now to FIG. 6, this shows a sequence (also called an "object interaction") diagram that illustrates a preferred sequence of steps. This sequence of steps implements double dispatch and is performed whenever a client wishes to execute a double-dispatch operation. The method begins when a client object (aClient) calls an Accept method 160, passing a parameter (anAppVisitorA) of type Visitor. The selected method (implemented by anAppElementC) is selected because the object "e" in the method call "e.Accept (v)" (see FIG. 4) is of type AppElementC; that is, the object anAppElementC is instantiated from the concrete class AppElementC 215.

The Accept method 160 performs the step of "v.Visit (this)" (see implementation 175 of FIG. 4). The "this" in this case will be an instance of a concrete descendant of Element. This will call the Visit operation 130 on object "v," which is the anAppVisitorA object. The anAppVisitorA object is an instance of concrete class AppVisitorA 265.

The implementation of the Visit operation 130 can, at this point, try to downcast its argument 140 to the AppElement 200 type. This occurs in step 242 (see FIG. 5B). If the downcast does not succeed, default behavior or an additional series of downcasts could be performed to identify another type at the AppElement level. If the downcast succeeds, the Visit method 130 then calls the Accept method 220 on the object anAppElementC, as indicated by the "this" parameter that was just downcast. In the example of FIG. 6, the downcast parameter will be of type AppElementC, and the Accept method 220 on the anAppElementC object will be called. This Accept method 220 then calls the specific Visit method corresponding to the "this" parameter passed in. In this case, the method is the Visit method 255. The Accept 220 method passes the "this" pointer, which is of type AppElementC, to the Visit method 255.

At this point, the types of both objects anAppElementC and anAppVisitorA are known. An operation may now be performed that is particular to these two objects and their specific types. Double dispatch has been effected.

Figure 7:
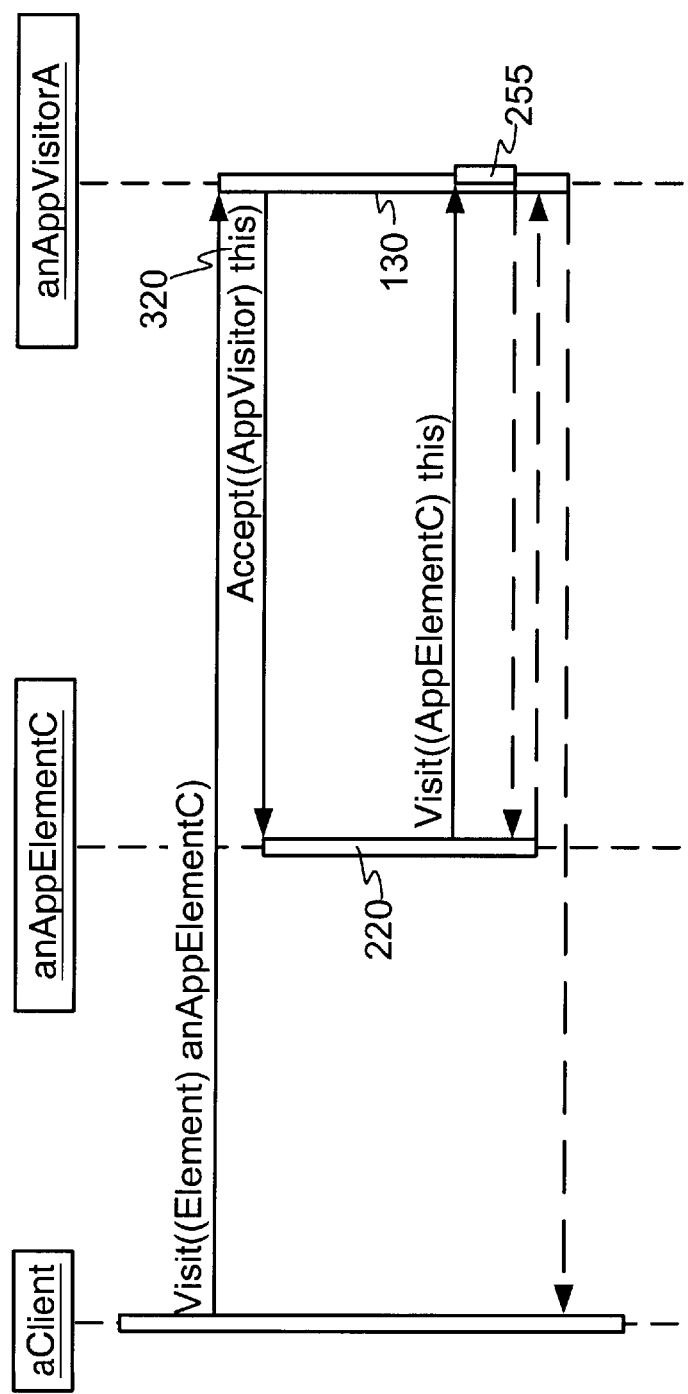

Referring now to FIG. 7, this figure shows another preferred sequence diagram for the structure of FIGS. 5A and 5B. In this case, the client object, aClient, calls the Visit method 130 directly. The client passes an instance of AppElementC as a parameter to the Visit method 130. This obviates the initial call, in FIG. 6, to the Accept method 160. The rest of the sequence of steps are described in reference to FIG. 6.

Figure 8:
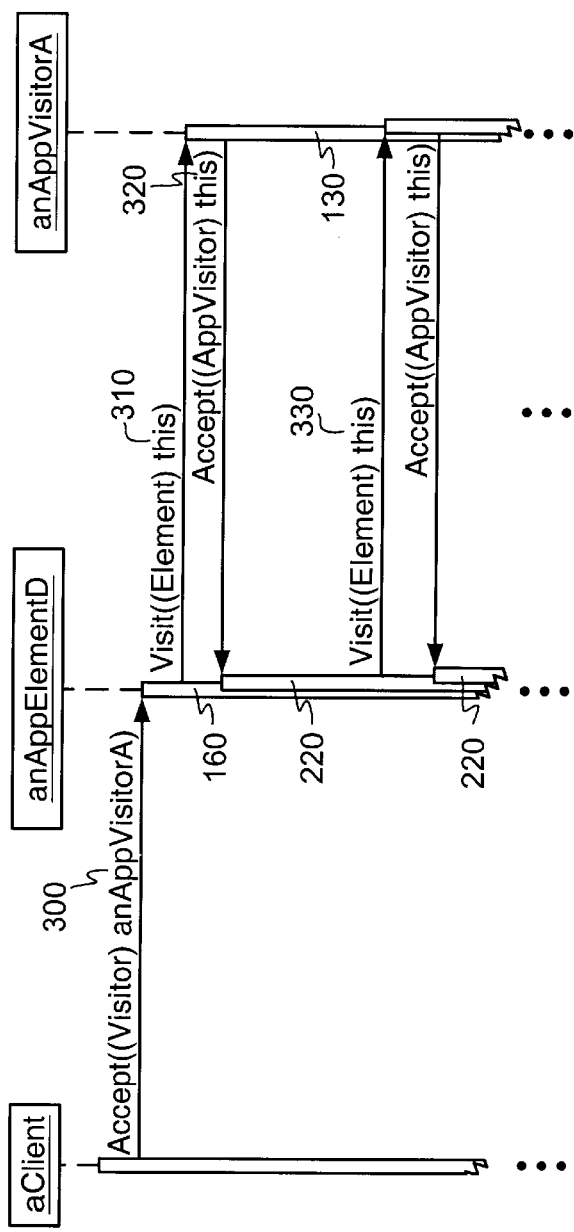
FIG. 8 shows a UML sequence diagram depicting interactions between Client, Visitor, and Element objects, specifically an infinite recursion between the latter two.

The invention as described thus far leaves open the possibility of infinite recursion when a new concrete subclass of AppElement 200, AppElementD 280, is introduced after AppVisitor 240 and its concrete subclasses 265–275 have been finalized. In FIGS. 5A and 5B, it can be seen that the AppVisitor 240 subclass of Visitor 100 defines polymorphic methods 245–255. Polymorphic method 245 corresponds to concrete class AppElementA 205, polymorphic method 250 corresponds to concrete class AppElementB 210, and polymorphic method 255 corresponds to concrete class AppElementC 215. Each concrete class 265–275 also implements a method Visit 130 that base class Visitor 100 defines. However, now that AppElementD 280 has been added, there is no specific polymorphic method defined in AppVisitor 240 for this specific AppElement subclass. Because of this, there is a possibility of an infinite recursion, should a client attempt to perform a double dispatch involving an instance of AppElementD. FIG. 8 presents an interaction diagram that illustrates the recursion.

As shown in FIG. 8, aClient calls Accept 160 on an instance of AppElementD, passing an instance of AppVisitorA 300. In turn, Accept calls Visit 130 on AppVisitorA, passing the receiving instance of AppElementD itself as a parameter 310. AppVisitorA inherits its implementation of Visit 130 unchanged from AppVisitor. This implementation attempts to downcast its argument to type AppElement, which succeeds. This allows Visit 130 to call Accept 220 on the newly downcast argument, passing the instance of AppVisitorA as a parameter 320. Since AppVisitor does not define an AppElementD-specific Visit operation, AppElementD implements Accept 220 to call Visit 130 on the AppVisitorA instance, passing the receiving AppElementD instance itself ("this") as a parameter 330. From this point on, the execution follows the same sequence of calls begun earlier. Thus an infinite recursion results.

Figure 9:
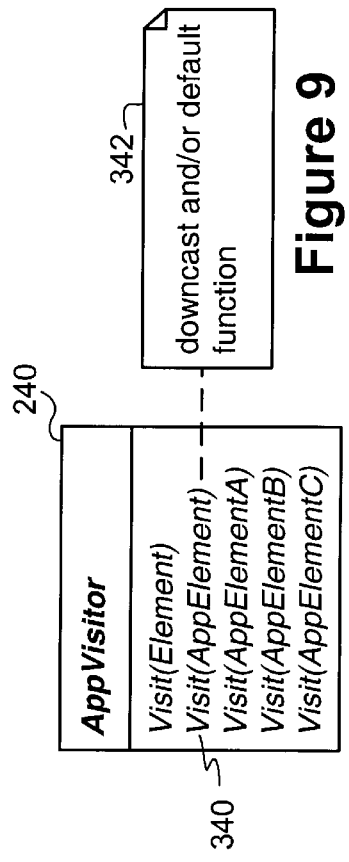
FIG. 9 shows a UML class diagram depicting the addition of an extension catchall to the interface for AppVisitor.

To prevent such recursion, AppVisitor may introduce a Visit operation 340 that takes an object of type AppElement 200 as a parameter, as shown in FIG. 9. Adding this operation, known generically as the "extension catchall," breaks the infinite recursion at 330. The infinite recursion is broken because implementation by AppElementD of Accept 220 can call Visit 340 rather than Visit 130. Visit 340 is preferable to Visit 130 because it is more specific to AppElementD than Visit 130. Visit 340 is not an exact match, however. An exactly matching Visit operation would take an instance of AppElementD as a parameter. However, providing such an operation would require changing an existing interface, that of AppVisitor 240, which is undesirable, impractical, or impossible in production environments.

As shown in FIG. 9, an implementation of the extension catchall of Visit 340 can attempt to downcast its received argument to a specific AppElementX, such as AppElementD. This would allow an operation specific to anAppElementD to be performed. If this operation is also specific to anAppVisitorA, then double dispatch is still effected. Moreover, the Visit 340 operation may also perform default behavior, such as alerting a programmer that AppElementD is not defined in AppVisitor 240. The default behavior could occur in addition to the downcasting or could replace the downcasting.

Figure 10:
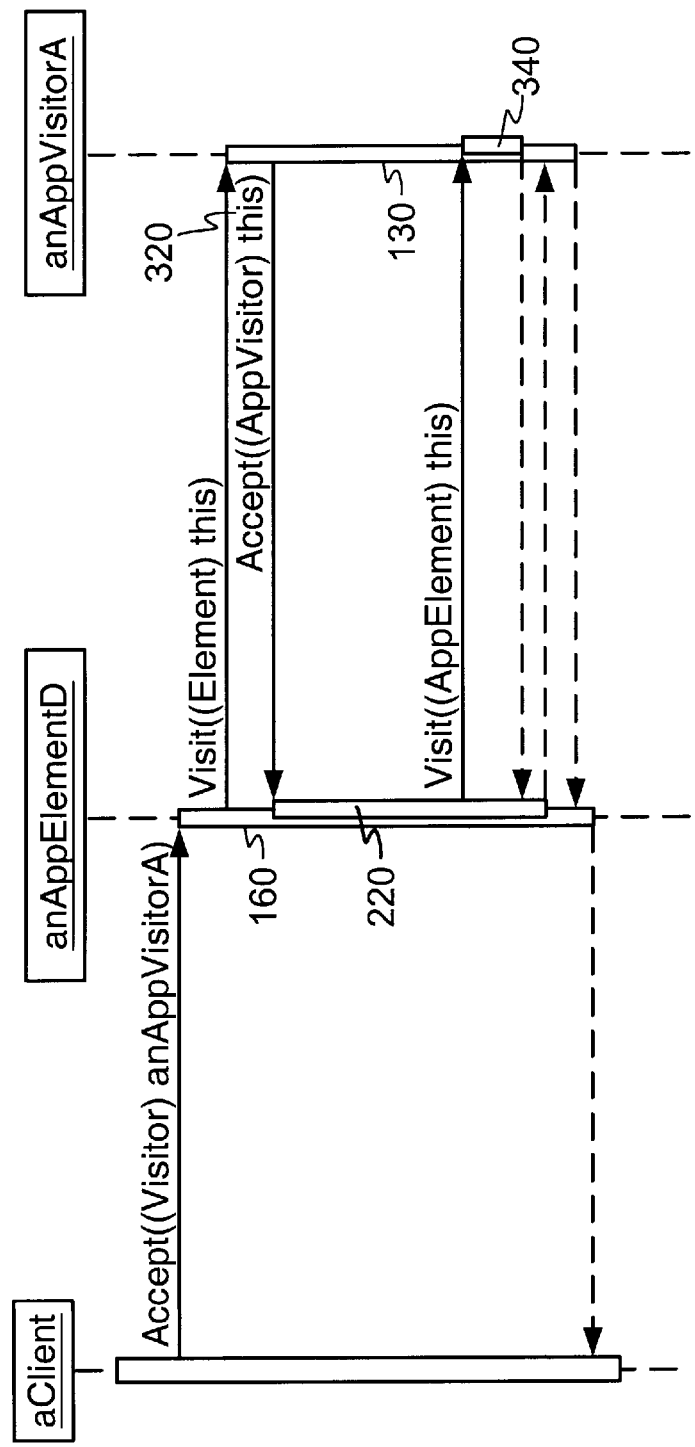
FIG. 10 shows a sequence diagram for the classes of FIGS. 5A and 5B when the extension catchall of FIG. 9 is added in accordance with a preferred embodiment of the present invention.

FIG. 10 shows a sequence diagram that occurs when AppElementD is not declared in AppVisitor 240 but is involved in double dispatch, and an extension catchall as shown in FIG. 9 exists. This sequence of steps is similar to those that occur in FIG. 6. The sequence begins when a client object (aClient) calls an Accept operation 160, passing a parameter (anAppVisitorA) of static type Visitor. The dynamic type in this case is AppVisitorA. This operation is polymorphic, and the implementation that executes is that of AppElementD, because here the object "e" in the method call "e.Accept(v)" (see FIG. 4) is of type AppElementD. The object anAppElementD is an instance of the concrete class AppElementD 280.

The implementation of Accept 160 performs the step of "v.Visit(this)" (see step 175 of FIG. 4). The "this" in this case is of type Element, since "v" is of type Visitor, and the only Visit operation defined in the Visitor interface takes an Element as a parameter. This in turn will call the Visit method 130 on the appropriate object, which is the anAppVisitorA object. The anAppVisitorA object is an object instantiated from AppVisitorA 265.

The Visit method 130 can, at this point, try to downcast its argument 140 to the AppElement 200 type. If the downcast succeeds, the Visit method 130 then calls the Accept method 220 on AppElementD, as indicated by the "this" parameter that was just downcast. In the example of FIG. 10, the downcast parameter will be of type AppElementD. The Accept method 220 on the anAppElementD object will be called. This Accept method 220 then calls the specific Visit method corresponding to the "this" parameter passed in. In this case, the method is the Visit method 340. The Accept 220 method passes the "this" pointer, which is of type AppElementD, to the Visit method 340. The Visit method 340 is called because there is no Visit method specific to the AppElementD class. However, at this point, the Visit method 340 has stopped the infinite recursion. The Visit method 340 can then continue to call an operation specific to an AppElementD and anAppVisitorA, if desired, by testing the type of its parameter and downcasting to the correct concrete AppElement subclass (AppElementD in this case). Alternatively, other default operations may be performed at this point.

Thus far, it has been assumed that most operations on Visitor and its non-concrete descendant classes are abstract. That is, these operations have no implementation and must therefore be implemented in concrete descendants. It may be useful to ascribe default behavior to these erstwhile abstract operations, thereby making them concrete. That is useful, for example, when the number of different double-dispatch behaviors is substantially less than the product of the number of concrete Element descendants and the number of concrete Visitor descendants. If so, programmers can define default behavior once for a large number of cases. Default behavior is also useful when a general, inefficient, or approximate algorithm can act as a back-up for more specialized, efficient, or accurate algorithms in concrete classes.

Figure 11A:
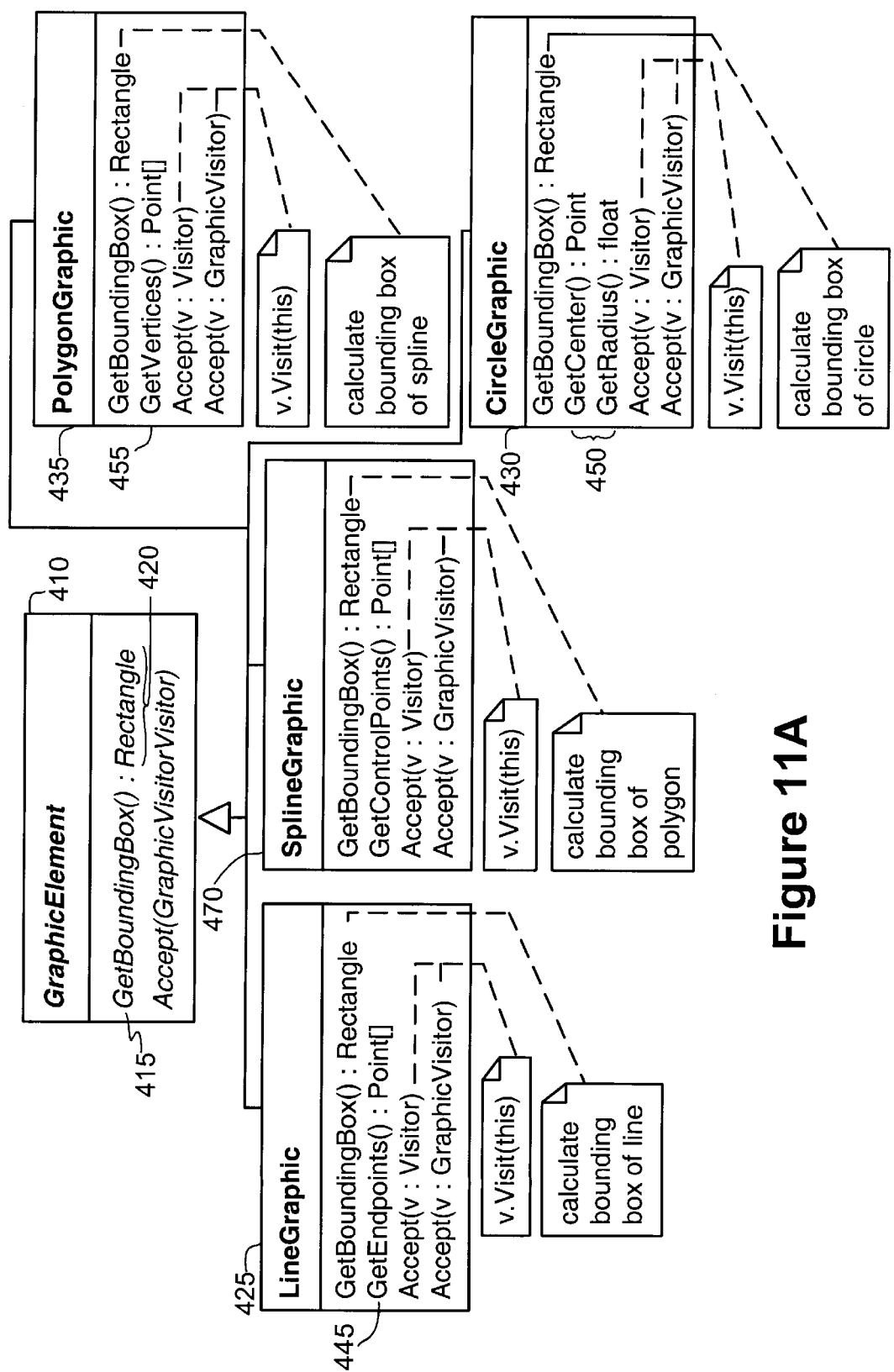
FIG. 11 shows UML class diagrams depicting a GraphicElement, an example of an abstract subclass of Element, abstract and concrete subclasses thereof, and depicting a GraphicVisitor abstract class, an example of an abstract subclass of Visitor, and a HitDetector concrete subclass thereof.
Figure 11B:
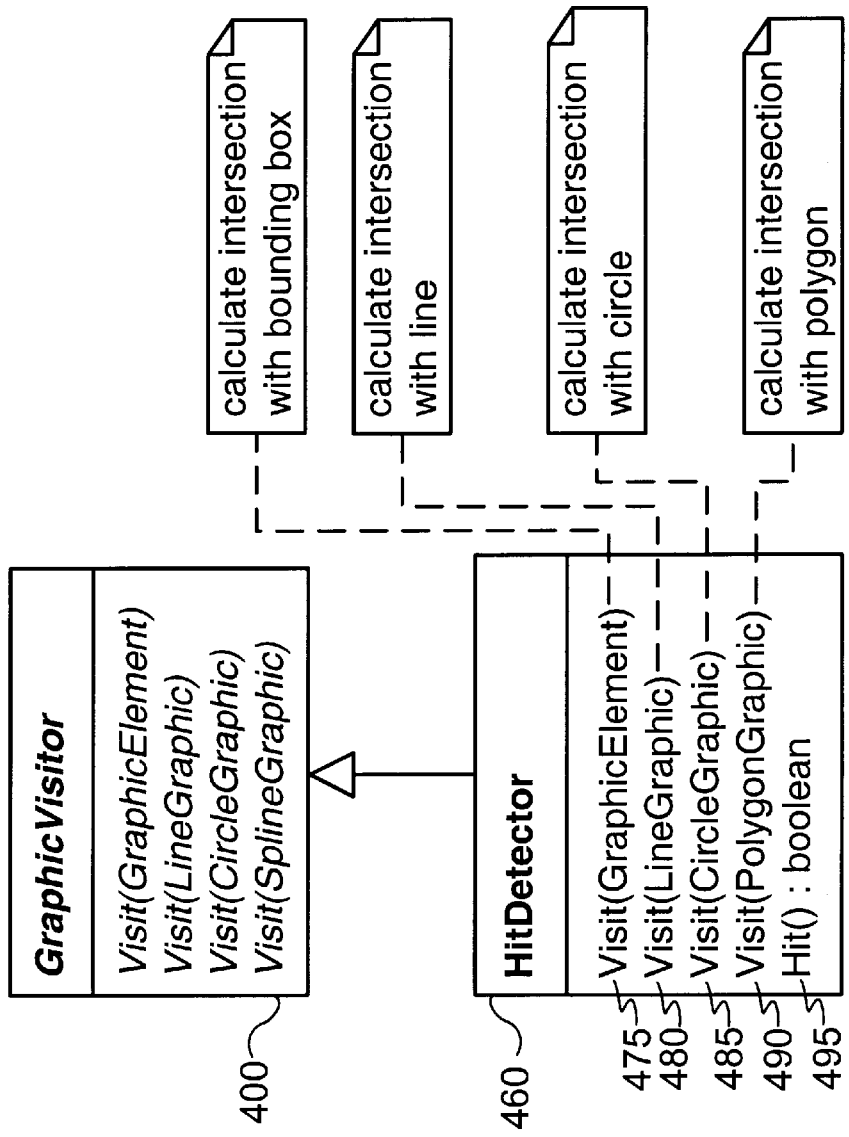

For example, FIGS. 11A and 11B show GraphicElement 410 and GraphicVisitor 400 abstract subclasses of Element 110 and Visitor 100, respectively. GraphicElement 410 and GraphicVisitor 400 act as base classes for concrete classes that implement two-dimensional graphical objects such as lines, circles, and polygons. GraphicElement 410 defines an abstract GetBoundingBox 415 operation, which declares a Rectangle 420 object as its return value. Concrete descendants of GraphicElement 410, including LineGraphic 425, CircleGraphic 430, and PolygonGraphic 435, implement GetBoundingBox 415 to return their smallest circumscribing rectangle as represented by an instance of Rectangle 420. Each of these concrete subclasses also defines unique operations 445–455 for accessing their definitions. For example, LineGraphic 425 defines GetEndpoints 445, which returns an array of two Point objects defining the line's endpoints. CircleGraphic 430 defines GetCenter and GetRadius 450, while PolygonGraphic 435 defines GetVertices 455.

HitDetector 460 is a concrete subclass of GraphicVisitor 400 that determines whether a given point intersects a particular GraphicElement. HitDetector 460 defines a Visit operation for each GraphicElement subclass 425–435. Each operation 480–490 implements an intersection algorithm specialized to the type of GraphicElement being visited using the subclass-specific accessors 445–455. Should a subclass of GraphicElement, say SplineGraphic 470, be introduced later, HitDetector 460 cannot compute an exact intersection, since it doesn't provide a SplineGraphic-specific Visit operation. However, it can compute an approximate intersection in its extension catchall 475, whose default behavior is to compute the intersection based on the GraphicElement's bounding box rather than its precise outline. Clients call Hit 495 to obtain the results of the computation.

Figure 12:
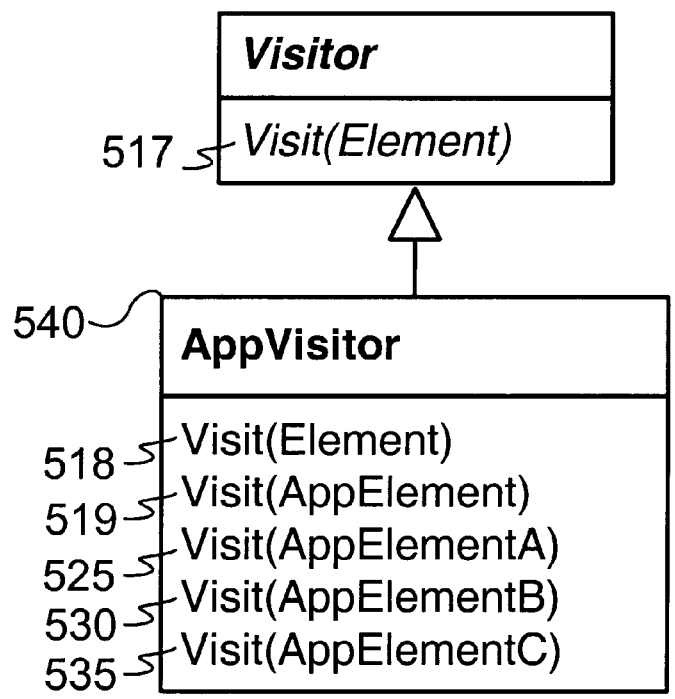
FIG. 12 shows a UML class diagram depicting operations that may house default behavior in the Visitor hierarchy, in accordance with a preferred embodiment of the present invention.

FIG. 12 illustrates where default behavior may be implemented. The classes in the figure correspond to those of the same name in FIGS. 4, 5A, 5B, and 9. Method 517 is called the "framework catchall." The framework catchall implements the least-specific behavior. Method 518 is the "application catchall," which specializes the framework catchall 517 to the needs of the group of visitors rooted in AppVisitor 540. The extension catchall 519 provides default behavior for concrete AppElement subclasses (e.g., AppElementD 280) introduced after AppVisitor 540 has been defined. AppVisitor's remaining operations 525–535 can implement default behavior specific to individual concrete AppElement descendants 205–215.

Now that the invention has been described by way of a preferred embodiment, various modifications within the spirit and scope of the present invention will occur to those skilled in the art. For instance, the Element and Visitor interfaces could be defined, instead of interfaces, as abstract classes. Additionally, AppElement and AppVisitor could be concrete classes or could leave the definition of Accept (AppVisitor) and Visit (AppElement) to subclasses. Thus the preferred embodiment should not be construed to limit the scope of the invention which is properly defined by the appended claims.

What is claimed is:

1. A method for carrying out double dispatch in an object-oriented program having a plurality of objects, each object being an instance of a class and having at least one type, the plurality of objects communicating by sending messages, the method comprising the steps of:

calling a first method on an object of a first type and passing, as a parameter, an object of a second type;

attempting to downcast, for all statically known subclasses of the second type, the object of the second type to one of these statically known subclasses until a downcast succeeds, else, if no downcast succeeds, terminating the method; and if a downcast succeeds, performing the following steps:

calling a first method on the object of the second type and passing, as a parameter, the object of the first type;

calling a second method, specific to the object of the second type, on the object of the first type and passing, as a parameter, the object of the second type, wherein the object of the first type also has a type of one of a plurality of concrete classes that are descendants of the first type, and wherein the object of the second type also has a type of one of a plurality of concrete classes that are descendants of the second type; and executing behavior specific to the one concrete class of the first type and the one concrete class of the second type.

2. The method of claim 1, wherein the step of calling a first method on an object of a first type and passing, as a parameter, an object of a second type comprises the steps of:

calling a second method on the object of the second type and passing, as a parameter, the object of the first type; and calling the first method on the object of the first type and passing, as a parameter, the object of the second type.

3. The method of claim 1, wherein the subclasses of the second type and the subclasses of the first type are abstract.

4. The method of claim 2, wherein the subclasses of the second type and the subclasses of the first type are abstract.

5. The method of claim 1, wherein the first type corresponds to a first base class, wherein the second type corresponds to a second base class, wherein each object of the first type is instantiated from a concrete descendent of the first base class, and wherein each object of the second type is instantiated from a concrete descendent of the second base class.

6. The method of claim 5, wherein the first and second base classes are defined as interfaces.

7. The method of claim 4, wherein a common abstract subclass of a first base class of the first type adds an extension catchall operation whose argument is an object of a type of a corresponding common abstract subclass of a second base class of the second type.

8. The method of claim 1, wherein there are both concrete and non-concrete classes derived from a first base class of the first type, and wherein at least one non-concrete class implements default behavior in at least one method.

9. A method for carrying out double dispatch in an object-oriented program having a plurality of objects, each object being an instance of a class, the plurality of objects communicating by sending messages, the method comprising the steps of:

a client object calling Accept on an object of type Element and passing an object of type Visitor;

Accept calling Visit on the object of type Visitor and passing the object of type Element, wherein the object of type Visitor also has a type of one of a plurality of AppVisitors, wherein each AppVisitor is an abstract subclass of Visit;

Visit downcasting the object of type Element to one of a plurality of AppElements, wherein each AppElement is an abstract subclass of Element;

repeating the preceding step for all statically known abstract subclasses of Element until a downcasts succeeds, else, if no downcast succeeds, terminating a message sequence and the method;

if a downcast succeeds, performing the following steps:

Visit calling an AppElement-specific Accept on the downcast object having a type of the one AppElement and passing the object of type Visitor itself as a parameter;

the AppElement-specific Accept calling an AppElement-specific Visit on the object of type Visitor and passing the object of type of the one AppElement; and the AppElement-specific Visit executing behavior specific to the one AppElement and the one AppVisitor types.

10. The method of claim 9, wherein classes supporting double dispatch are organized so that new concrete classes of type Element are added in groups, each concrete class in a group derived from a common abstract subclass of Element, and a corresponding group of concrete classes of type Visitor are derived from a common abstract subclass of Visitor.

11. The method of claim 9, wherein a common abstract subclass of Visitor adds an extension catchall operation whose argument is an object of a type of a corresponding common abstract subclass of Element.

12. The method of claim 9, wherein there are both concrete and non-concrete classes derived from the Visitor class, and wherein at least one non-concrete Visitor class implements default behavior in at least one Visit.

13. A system for carrying out double dispatch in an object-oriented environment, comprising:

a memory that stores computer-readable code; and a processor operatively coupled to said memory, said processor configured to implement said computer-readable code, said computer-readable code configured to:

call a first method on an object of a first type and pass, as a parameter, an object of a second type;

attempt to downcast, for all statically known subclasses of the second type, the object of the second type to one of these statically known subclasses until a downcast succeeds, else, if no downcast succeeds, terminate the method; and if a downcast succeeds, perform the following:

call a first method on the object of the second type and pass, as a parameter, the object of the first type;

call a second method, specific to the object of the second type, on the object of the first type and pass, as a parameter, the object of the second type, wherein the object of the first type also has a type of one of a plurality of concrete classes that are descendants of the first type, and wherein the object of the second type also has a type of one of a plurality of concrete classes that are descendants of the second type; and execute behavior specific to the one concrete class of the first type and the one concrete class of the second type.

14. The apparatus of claim 13, wherein the computer readable code, when it calls a first method on an object of a first type and passes, as a parameter, an object of a second type, is further configured to:

call a second method on the object of the second type and pass, as a parameter, the object of the first type; and call the first method on the object of the first type and pass, as a parameter, the object of the second type.

15. An article of manufacture for carrying out double dispatch in an object-oriented environment, the article of manufacture comprising a computer readable medium having computer readable code means embodied thereon, said computer readable program code means comprising:

a step to call a first method on an object of a first type and pass, as a parameter, an object of a second type;

a step to attempt to downcast, for all statically known subclasses of the second type, the object of the second type to one of these statically known subclasses until a downcast succeeds, else, if no downcast succeeds, terminate the method; and a step to perform the following steps if the downcast succeeds:

a step to call a first method on the object of the second type and pass, as a parameter, the object of the first type;

a step to call a second method, specific to the object of the second type, on the object of the first type and pass, as a parameter, the object of the second type, wherein the object of the first type also has a type of one of a plurality of concrete classes that are descendants of the first type, and wherein the object of the second type also has a type of one of a plurality of concrete classes that are descendants of the second type; and a step to execute behavior specific to the one concrete class of the first type and the one concrete class of the second type.

16. The article of manufacture of claim 15, wherein the step to call a first method on an object of a first type and passes, as a parameter, an object of a second type, comprises:

a step to call a second method on the object of the second type and pass, as a parameter, the object of the first type; and a step to call the first method on the object of the first type and pass, as a parameter, the object of the second type.

* * * * *